Patented Oct. 24, 1950

2,527,162

UNITED STATES PATENT OFFICE 2,527,162

INTERPOLYMERS OF A STYRENE, AN ACRYLONITRILE, AND A CONJUGATED DIOLEFIN

Byron M. Vanderbilt, Westfield, N. J., and Frances Bascom, Staten Island, N. Y., assignors to Standard Oil Development Company, a corporation of Delaware No Drawing. Application March 26, 1946, Serial No. 657,348

3 Claims. (Cl. 260—80.7)

This invention relates to new and improved multipolymers. More particularly this invention relates to the products formed by the polymerization in aqueous emulsion of mixtures containing a styrene, an acrylic nitrile and a conjugated diene.

It is well known that highly plastic rubber-like polymers can be synthesized from diolefins and mixtures of a major proportion of a diolefin and a minor proportion of other unsaturated comonomers such as styrene, substituted styrenes, acrylic nitriles, acrylic acid esters, fumaric acid esters, unsaturated ketones and the like. It has also been proposed to prepare solid, thermoplastic resinous materials by copolymerizing in aqueous emulsion from 65 to 95 wt. per cent of a styrene and from 35 to 5 wt. per cent of a conjugated diolefin. The latter materials have shown promise as processing aids for rubber-like materials, as suitable blending agents for waxes and asphalts and as protective coatings when used as such or in combination with other resins and/or rubber-like materials. However, one shortcoming of such high styrene resins is their high solubility in mineral oils.

It has now been found that resins which are oil resistant and highly suitable for use in the production of protective coatings are obtained if a styrene, a nitrile of a low molecular weight unsaturated acid such as acrylonitrile and a diene such as butadiene, are copolymerized in certain proportions in aqueous emulsion. The products formed are resinous rather than rubber-like in nature and yield tack-free films of excellent strength and flexibility and which are unaffected by petroleum naphthas.

The multipolymers in accordance with the present invention are prepared from mixtures containing from 50 to 75 wt. per cent of a styrene, from 15 to 40 wt. per cent of an acrylic nitrile and from 35 to 10 wt. per cent of a conjugated diolefin.

The aryl olefins or styrenes which may be used in accordance with the present invention correspond to the general formula

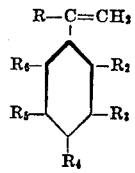

wherein R stands for a member of the group consisting of hydrogen, methyl and ethyl, and $R_2$, $R_3$, $R_4$, $R_5$ and $R_6$ stand for the same or different members of the group consisting of hydrogen, methyl, ethyl, methoxy, ethoxy, chlorine, bromine, fluorine and cyano. Suitable aryl olefins include ordinary styrene, alpha methyl styrene, alpha methyl para methyl styrene, para methyl styrene and the ring substituted mono- and dichloro styrenes. Instead of using a single aryl olefin, mixtures of two or more aryl olefins or styrenes may be used.

The acrylic nitriles which may be used are acrylonitrile, methylacrylonitrile, ethacrylonitrile and the like as well as mixtures of two or more of these nitriles.

The diolefins which may be used are conjugated diolefins, preferably those containing from 4 to 6 carbon atoms per molecule such as butadiene-1,3, isoprene, piperylene, dimethyl butadiene, methyl pentadiene and the like. In lieu of using a single diene, we may use mixtures of two or more dienes. Butadiene and isoprene are the preferred dienes.

The polymerization may be effected by dispersing the mixture of monomers in from an equal to a threefold quantity of water using a soap such as sodium oleate, sodium palmitate or tallow acid soaps, or surface active agents such as alkylated benzene or naphthalene sulfonates as emulsifying agent. The amount of emulsifier is ordinarily between about 0.25 to about 5 wt. per cent based upon the water.

The polymerization may be catalyzed by a small quantity of a per-type compound which is active under the reaction conditions such as hydrogen peroxide, benzoyl peroxide, perborates or persulfates of ammonia or persulfates of the alkali metals. There may also be provided in the reaction mixture a small amount, i. e. about 0.1 to about 1% based upon the monomers of a polymerization modifier or activator such as an aliphatic mercaptan of from six to about eighteen carbon atoms per molecule.

The polymerization reaction is carried out in a pressure vessel provided with means for maintaining the reaction mixture under a high degree of agitation. The reaction is ordinarily carried out for periods of from about 6 to 30 hours and at temperatures of about 25 to 75° C. When the monomers are at least about 85% converted to polymers, the latex-like dispersion may be coagulated by treating the latex with a suitable coagulant such as brine or an aliphatic alochol such as isopropyl alcohol. The coagulate may be washed with water and/or alcohol in order to remove emulsifiers and soluble impurities whereupon the coagulate may be dried in an air dryer or preferably on heated rollers. In lieu of coagulating the latex and recovering the dry polymer it is also possible, in some cases, to apply the latex in coating operations either as formed or after concentrating the latex to somewhat higher solids contents.

The polymers produced in accordance with the present invention are extremely valuable when used in various coating compositions. They may be used, for example, in the production of lacquers in combination with nitrocellulose, cellulose acetate, cellulose ethers and the like. They may also be used advantageously with other coating materials such as drying oils, semi-drying oils, various resins such as glyptals, urea-formaldehydes, cumarones, melamines, etc., to produce coatings of a superior nature. They may also be used in enamels with or without pigments.

These copolymers are particularly valuable for protecting metals from corrosion which may come in contact with mineral oils such as in the coating of the inner walls of oil or gasoline storage tanks, tankers and tank cars which may become corroded from salt water and the like. These tripolymers, or multipolymers are also valuable for coating the exterior of metal vessels which may come in contact with acidic fumes, oil vapors and moisture.

The multipolymers in accordance with the present invention alone or in combination with other coating materials are excellent for coating or indurating paper, fibers, textiles and the like especially where such products require high resistance to the penetration of oils and fats.

The multipolymers are useful for modifying asphalt and petroleum or vegetable waxes. Rubbery polymers, such as natural rubber, the butadiene-1,3 polymers and copolymers, low temperature copolymers of isobutylene and the like with diolefins such as butadiene, isoprene, dimethyl butadiene, methyl pentadiene etc. are rendered more oil-resistant and the cold flow of the rubbers is reduced when blended with the multipolymers in accordance with the present invention.

Instead of using the multipolymer material as formed, it may be chlorinated, sulfonated, oxidized, reacted with sulfur chloride and the like in order to give modified materials of useful properties.

The following examples are included in order to illustrate the present invention more fully.

*Example 1.*—A mixture of 70 parts of styrene, 15 parts of acrylonitrile and 15 parts of isoprene was copolymerized in a soap solution using lauryl mercaptanpotassium persulfate as promoter-catalyst. The reaction was carried out for about 16 hours at about 27° C. whereabout the latex was coagulated with brine and the precipitate washed with water and dried. The powdered resin was not dissolved or swollen by petroleum naphthas but was dissolved in benzene to the extent of a 15% solution. The 15% solution of the resin in benzene gave tough, transparent films when applied to metal surfaces by means of a brush.

*Example 2.*—A number of tripolymers of styrene, acrylonitrile and butadiene in different proportions were prepared using the following recipe:

100 parts monomers
200 parts water
4 parts oleic acid
1.35 parts potassium hydroxide
0.3 part potassium persulfate
0.5 part commercial dodecyl mercaptan The reaction mixtures were heated at 45° C. for 16 hours to obtain conversions to resinous polymers varying from 92 to 100% so that it is safe to assume that the tripolymers were of approximately the same composition as the feed. The polymers were precipitated from their latices by brine and washed free of emulsifier on a washing mill or by reslurrying in hot water. The composition of the feed for the several polymers, the appearance of each and the solubility in 54° naphtha and mixtures of 60 parts of 54° naphtha and 40 parts of benzene are summarized in the following table.

| Polymer | Feed Composition | | | Appearance of Polymer | Solubility | | Appearances— | |
|---|---|---|---|---|---|---|---|---|
| | Styrene | Acrylonitrile | Butadiene | | 54 Naphtha [1] | 60/40 Naphtha-Benzene [1] | of 5% Sol. of Polymer in Benzene | of 5% Sol. of Polymer in Mixed Solvent [2] |
| A | 50 | 20 | 30 | Leather-like and Pliable. | Unchanged | Became Gelatinous | Thin | Thin. |
| B | 50 | 30 | 20 | Tough Although Pliable. | ---do--- | Very slight swelling [3] | Slightly Thicker than A. | Gelatinous. |
| C | 50 | 40 | 10 | Very Hard | ---do--- | ---do--- [4] | No solution | Very Gelatinous. |
| D | 60 | 20 | 20 | Hard Leather-like but Pliable | ---do--- | Became Gelatinous | ---do--- | Thin. |
| E | 60 | 30 | 10 | Very Hard | ---do--- | Slight Swelling | ---do--- | Do. |
| F | 70 | 20 | 10 | ---do--- | ---do--- | Became Gelatinous | ---do--- | Do. |

[1] One gram of polymer in 100 cc. of solvent at room temperature.
[2] Mixed solvent is 75% benzene and 25% methyl ethyl ketone.
[3] Sample increased 48% in weight due to absorbed solvent.
[4] Sample increased 31% in weight due to absorbed solvent.

Solutions or dispersions of the multipolymers may be aerated in the proper manner and converted into foamed sponge-like articles which may be used as such after removing solvent or vehicle or may be compounded and cured in order to give more rigid materials which can be used for insulating purposes.

The tripolymers are especially useful in compositions as shoe sole and heel material where high resistance to oils is desired.

Solutions of these polymers were deposited upon sheets of glass (one coat) as well as on soft steel plates (three coats). In general the films formed were clear and tenacious and in the case of the three-coat film on the steel plates no change was noted when the plates were bent through an angle of 180°. None of the coatings was at all sticky.

The foregoing description contains a limited number of embodiments of the present invention, It will be understood that the present invention is not limited to the specific details disclosed since numerous variations are possible without departing from the scope of the following claims.

What we claim and desire to secure by Letters Patent is:

1. Hard, naphtha-insoluble benzene-soluble resins suitable for protective coating consisting of from 50 to 60 weight percent of combined styrene in polymeric form, about 30 weight percent of combined acrylonitrile in polymeric form and from 20 to 10 weight percent of combined butadiene in polymeric form.

2. Hard, naphtha-insoluble benzene-soluble resins suitable for protective coating consisting of 50 weight percent of combined styrene in polymeric form, 30 weight percent of combined acrylonitrile in polymeric form and 20 weight percent of combined butadiene in polymeric form.

3. Hard, naphtha-insoluble benzene-soluble resins suitable for protective coating consisting of 60 weight percent of combined styrene in polymeric form, 30 weight percent of combined acrylonitrile in polymeric form and 10 weight percent of combined butadiene in polymeric form.

BYRON M. VANDERBILT.
FRANCES BASCOM.

REFERENCES CITED

The following references are of record in the file of this patent:

UNITED STATES PATENTS

| Number | Name | Date |
|---|---|---|
| 1,933,052 | Fikentscher | Oct. 31, 1933 |
| 2,374,841 | Semon | May 1, 1945 |
| 2,375,140 | Semon | May 1, 1945 |
| 2,398,105 | Mack | Apr. 9, 1946 |

FOREIGN PATENTS

| Number | Country | Date |
|---|---|---|
| 456,442 | Great Britain | Aug. 8, 1935 |
| 588,785 | Germany | Nov. 27, 1933 |

OTHER REFERENCES

Ser. No. 334,574, Konrad (A. P. C.), published Apr. 20, 1943.